United States Patent Office 3,405,114
Patented Oct. 8, 1968

3,405,114
PRODUCTION OF 1,3-DIENE POLYMERS
Herbert Naarmann, and Heinz Eilingsfeld, Ludwigshafen (Rhine), and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed June 20, 1966, Ser. No. 558,599
Claims priority, application Germany, June 24, 1965, B 82,539
6 Claims. (Cl. 260—94.3)

This invention relates to the production of 1,3-diene polymers using transition metal chelate complexes of thio-$\alpha,\gamma$-dicarbonyl compounds as polymerization catalysts.

It is known that 1,3-dienes may be polymerized using catalysts of compounds, stable in water, of transition metals of Groups VII and VIII of the Periodic System in aqueous emulsion. To achieve good conversions, however, very large amounts of catalysts are required with reference to the polymer obtained, for example about 15 parts by weight of catalyst for each 100 parts of polymer. Moreover it is a disadvantage that the polymerization is seriously disturbed by very small amounts of oxygen.

It is also known that butadiene or mixtures of butadiene and styrene may be polymerized in aqueous emulsion using $\alpha,\gamma$-dicarbonyl compounds of divalent cobalt and of peroxides. From conversions of about 20%, however, 1,3-diene polymers are obtained which contain a considerable proportion of gel substances and the polymerization is difficult to control.

It has also been proposed to polymerize 1,3-dienes using metal chelate complexes of metals of Groups IV to VIII of the Periodic System of Elements in the presence of water. In this case, too, the polymerization is difficult to control and gel substances form in the case of conversions of about 30% upwards.

We have now found that 1,3-diene polymers can be advantageously prepared by polymerization of 1,3-dienes having four to six carbon atoms by using polymerization catalysts which comprise transition metal chelate complexes of thio-$\alpha,\gamma$-dicarbonyl compounds.

The thio-$\alpha,\gamma$-dicarbonyl compounds may be prepared for example from $\alpha,\gamma$-dicarbonyl compounds and hydrogen sulfide by conventional methods. The chelate complexes may be prepared for example from thio-$\alpha,\gamma$-dicarbonyl compounds and salts of transition metals, again by conventional methods.

Suitable thio-$\alpha,\gamma$-dicarbonyl compounds for the chelate complexes to be used according to this invention are in general monothio- and dithio-$\alpha,\gamma$-dicarbonyl compounds, for example monothio-$\alpha,\gamma$-diketones, e.g. monothioacetylacetone and monothiobenzoylacetone; dithio-$\alpha,\gamma$-diketones, e.g. dithioacetylacetone, dithiobenzoylacetone and dithiodibenzoylmethane; $\beta$-thioketocarboxylic acids and their derivatives, e.g. the methyl, ethyl, propyl and butyl esters of thioacetoacetic acid; $\beta$-thioketoaldehydes, e.g. $\beta$-thioketobutyraldehyde; and mesomeric compounds which exhibit thio-$\alpha,\gamma$-dicarbonyl structure in at least one mesomeric limiting form, e.g. thiosalicyclic acid and thiosalicylaldehyde.

Examples of suitable transition metals for the chelate complexes to be used according to this invention are monovalent and divalent copper and mercury; monovalent silver; monovalent and trivalent thallium; trivalent chromium, manganese, vanadium, gold, cobalt and ruthenium; tetravalent cerium and titanium; divalent nickel, platinum and palladium; pentavalent vanadium, niobium and tantalum.

Examples of particularly suitable chelate complexes are copper (II) thioacetoacetic ethyl ester, cobalt (III) monothioacetylacetonate, manganese (III) monothiobenzoylacetone, cerium (IV) dithiobenzoylmethane and thallium (I) monothioacetylacetonate.

It is possible to use one chelate complex of a dithio-$\alpha,\gamma$-dicarbonyl compound or a mixture of two or more of such chelate complexes.

In some cases it is advantageous to use cycloalkenes as catalysts in addition to the chelate complexes of the thio-$\alpha,\gamma$-dicarbonyl compounds.

Examples of suitable cycloalkenes are cyclopentadiene; cyclohexadiene; cycloheptadiene; cycloheptatriene; cyclooctatetraene; cyclooctadiene-1,5; cyclooctadiene-1,4; cyclooctadiene-1,3; the cyclododecatrienes, e.g. cyclododecatriene - 1,5,9 (trans,trans,trans), cyclododecatriene - 1,5,9 (cis,trans,trans), cyclododecatriene-1,5,9 (cis,cis,cis); and cycloheptatriene. If cycloalkenes are used as cocatalysts, they are used in general in amounts of from 0.3 to 40 moles, preferably from 0.5 to 20 moles, of cycloalkene per mole of the chelate complexes of thio-$\alpha,\gamma$-dicarbonyl compounds.

In some instances it is advantageous to use organic halogen compounds as cocatalysts in addition to the chelate complexes of the thio-$\alpha,\gamma$-dicarbonyl compounds and—if desired—also in addition to the cycloalkenes.

Examples of suitable organic halogen compounds are halogenated hydrocarbons, e.g. methylene chloride, chloroform, bromoform, iodoform, carbon tetrachloride, trichloroethylene, ethyl bromide, ethyl iodide, n-butyl chloride, n-butyl bromide, tertiary-butyl chloride, n-amyl chloride, isoamyl chloride, 1,2-dichloroethane, 1,4-dichlorobutane, 1,4-dichlorobutene-2, 1,1',2,2'-tetrachloroethane, hexachloroethane, 1,2-dichloroethylene, tetrachloroethylene, cyclohexyl chloride, cyclohexyl bromide, chlorobenzene, bromobenzene, iodobenzene, fluorobenzene, xylylene dichloride, o-dichlorobenzene, m-dichlorobenzene, p-dichlorobenzene, symmetrical trichlorobenzene, hexachlorobenzene and hexachlorocyclohexane. Other examples are: 2-amino-5-iodopyrimidine, 2,4-dinitrofluorobenzene, cyanuryl chloride, chloropyridines, and also halogenated carboxylic acids and their derivatives, halogenated alcohols, ketones and ethers, e.g. chloroacetic acid, $\alpha$-bromocaproic acid, $\omega$-bromoacetophenone, pentachloropropanol and dichlorodimethyl ether. If organic halogen compounds are used as cocatalysts, it is preferred to use 0.01 to 20 parts by weight of organic halogen compounds to 1 part by weight of the chelate complexes of thio-$\alpha,\gamma$-dicarbonyl compounds.

In some cases it is also advantageous to use as cocatalysts in addition to the chelate complexes of thio-$\alpha,\gamma$-dicarbonyl compounds and—if desired—also in addition to the cycloalkenes and/or organic halogen compounds, salts of transition metals of Groups I to III of the Periodic System of Elements. Examples are halides, sulfates, nitrates, oxalates and acetates of copper, zinc, mercury, silver and gold. Examples of particularly suitable salts are copper (II) chloride, gold (III) bromide, silver (I) nitrate, gallium trichloride and thallium (I) chloride.

The amount of transition metal chelate complexes of thio-$\alpha,\gamma$-dicarbonyl compounds required is in general from 0.001 to 3% by weight, preferably 0.01 to 1% by weight, on the amount of monomers.

It is possible to use as components of the catalysts, in addition to the polymerization catalysts hereinbefore defined and—if desired—also in addition to the cocatalysts hereinbefore defined, transition metal chelate complexes of $\alpha,\gamma$-dicarbonyl compounds which contain no sulfur. Examples of such chelate complexes are complexes of acetylacetone, benzoylacetone, dibenzoylmethane and acetoacetic acid esters, for example with ethyl alcohol and 3-methylbutene-(1)-ol-(3), and also compounds which exhibit $\alpha,\gamma$-dicarbonyl structure in at least one mesomeric limiting form, like salicylic acid and salicyl aldehyde.

The temperature and pressure conditions in the process may be varied within wide limits. Polymerization is in general carried out at temperatures of from 0° to 100° C. and at pressures between atmospheric pressure and 16 atmospheres. Higher pressures and temperatures may however be used in special cases. It is preferred to carry out the polymerization at temperatures of from 20° to 80° C.

Polymerization may be carried out in substance, solution, suspension or emulsion. It is however preferred to carry out polymerization in aqueous emulsion using the conventional emulsification assistants, such as emulsifiers and protective colloids. Examples of suitable emulsification assistants are alkali metal salts of paraffin sulfonic acids or sulfonated alkylphenols; alkali metal salts of higher fatty acids; dextranes; cellulose ethers; and polyvinyl alcohols. If polymerization is carried out in aqueous emulsion the aqueous phase may contain buffer substances, e.g. phosphates or ethylene diamino tetracetic acid and/or polymerization regulators, e.g. dodecylmercaptan.

In the production of 1,3-diene polymers by the process according to this invention, 1,3-dienes, e.g. butadiene, isoprene, 2,3-dimethylbutadiene, 2-phenylbutadiene and chloroprene, may be homopolymerized or copolymerized with each other in any proportions. The process according to this invention also makes it possible to produce 1,3-diene polymers which are copolymers of one or more 1,3-dienes and one or more other ethylenically unsaturated copolymerizable monomers. In this case the proportion of 1,3-dienes in the reaction mixture should be at least 50% by weight on the total monomers. Ethylenically unsaturated monomers suitable for the copolymerization with 1,3-dienes are esters of $\alpha,\gamma$-ethylenically unsaturated monocarboxylic acids, e.g. the methyl, ethyl, propyl, n-butyl, isobutyl, tertiary-butyl, 2-ethylhexyl esters of acrylic acid or methacrylic acid; esters of fumaric and maleic acid, e.g. the ethyl and n-butyl esters; acrylic acid; methacrylic acid; acrylonitrile; methacrylonitrile; vinylaromatic compounds, e.g. styrene; vinyl ethers, e.g. vinyl methyl ether, vinyl n-butyl ether and vinyl isobutyl ether; and vinyl esters, e.g. the methyl, ethyl, propyl, n-butyl and tertiary-butyl esters of acetic acid or propionic acid.

The process according to this invention may be carried out continuously or batchwise. When working continuously, for example a packed reactor or a plurality of vessels in sequence may be used as reactors. Polymerization is usually carried to a conversion of about 70%. It is also possible to carry the polymerization to higher conversions, for example to 90% or more, without obtaining gel constituents. This is a particular advantage of the process according to this invention.

It is also an advantage of the process that a great number of compounds which are suitable for stabilizing poly-1,3-dienes, such as trinonylphenyl phosphite, do not disturb the polymerization and therefore may be added to the polymerization mixture before or during the polymerization. In this way an optimum stabilizing effect can be achieved and the subsequent incorporation of stabilizers, which is much more expensive, can be avoided.

In the case of emulsion polymerization, the polymer is obtained in the form of an aqueous dispersion which in general contains from 5 to 50% by weight of polymer. It is preferable to add to the dispersion, prior to precipitation of the polymer, a strong complex-forming substance which binds the metal ions of the catalyst in the form of water soluble stable complex compounds. Alkali metal cyanides, alkali metal phosphates or compounds of the type of ethylenediamine tetraacetic acid and its derivatives are particularly suitable for this purpose. Practically catalyst-free and if desired stabilized polymers are then obtained without special purification.

High molecular weight elastomeric polymers are usually obtained by the process. They have a particularly low content of 1,3-diene units which are polymerized in 1,2-combination (about 5 to 15% by weight, as compared with more than 30% in the case of polymers which have been prepared using peroxide catalysts). The polymers are suitable for example for the production of motor tires or as additives to other plastics, such as polyolefins.

The invention is further illustrated by the following examples, in which parts and percentages are by weight. The K values given in the examples are measured according to H. Kikentscher, Cellulose-chemie 13 (1932) 58 in 1% solution in benzene, and the solution viscosities are measured in 5% solution in toluene.

Example 1

(a) 400 parts of water, 25 parts of a 20% aqueous solution of the sodium salt of a paraffinsulfonic acid having eight to twelve carbon atoms, 0.2 part of cobalt (III) thioacetylacetonate, 0.1 part of manganese (III) acetylacetonate and 0.5 part of cyclooctadiene-1,5 are placed in an autoclave. 150 parts of butadiene is added to the mixture while stirring. Polymerization is carried out for twenty hours at 60° C. and a dispersion is obtained having a solids content of 23.4% by weight. This is equivalent to a conversion of 86.5%.

0.3 part of trinonylphenyl phosphite is added to the dispersion as a stabilizer. The polymer, after it has been precipitated, worked up and dried, is soluble in the usual solvents without gel formation and has a K value of 84 and a solution viscosity of 52 centipoises. The Mooney plasticity ML-4'/100° C. (ASTM 927–57T) is 36 and the Defo value at 30° C. is 1050/38 and at 80° C. is 615/35 (measured according to DIN 53,514).

(b) When adding the butadiene within five hours gradually while stirring to the catalyst dispersion, under otherwise the same conditions a polymer dispersion is obtained having a solids content of 22% by weight. This is equivalent to a conversion of 84%. The K value of the polymer is then 79 and its solution viscosity is 45 centipoises.

(c) If on the other hand butadiene be emulsified in the aqueous phase and a mixture of cobalt (III) thioacetylacetonate, cyclooctadiene-1,5 and trinonylphenyl phosphite be added gradually within five hours, under otherwise the same conditions a dispersion is obtained having a solids content of 24.8% by weight equivalent to a conversion of 93%. The K value of the polymer is then 97 and its solution viscosity is 153 centipoises.

Example 2

Polymerization is carried out as described in Example 1(a) but manganese (III) thioacetoacetic ester is used as the catalyst component instead of cobalt (III) thioacetylacetonate. The other conditions are the same. A dispersion is obtained having a solids content of 24.9% by weight. This is equivalent to a conversion of 94.5%. The product obtained is soluble in the usual solvents without any gel formation.

Example 3

Polymerization is carried out as in Example 1(a) but, instead of butadiene, a mixture of 95 parts of butadiene and 5 parts of styrene is used and, instead of cobalt (III) thioacetylacetonate, nickel (II) thioacetic ethyl ester is used. A dispersion is obtained having a solids content of 19% by weight, equivalent to a conversion of 98%. The K value of the polymer is 79, its solution viscosity is 22 centipoises, its tensile strength at break is 235 kg./sq. cm. (measured according to DIN 53,504) and its elongation is 475% (measured according to DIN 53,504). The polymer dissolves in the usual solvents without gel formation.

Example 4

Polymerization is carried out as described in Example 1(a) but using a mixture of 145 parts of butadiene and 5 parts of vinyl ethyl ether instead of butadiene and rhodium (III) thiobenzoylacetonate instead of cobalt (III) thioacetylacetonate. A dispersion is obtained having a solids content of 22% by weight, equivalent to a conversion of 80%. 2 parts of β-naphthylamine is added during the polymerization. The K value of the polymer is 89 and its solution viscosity is 128 centipoises. The polymer is soluble in the usual solvents without gel formation.

Example 5

500 parts of water, 40 parts of a 20% solution of the potassium salts of resin acids, 0.5 part of cerium (IV) thiosalicylate, 5 parts of carbon tetrachloride, 100 parts of styrene and 100 parts of isoprene are introduced successively into an autoclave and polymerization is carried out for thirty hours at 60° C. A dispersion is obtained which has a solids content of 25% by weight, equivalent to a conversion of about 90%.

The K value of the polymer is 89.5 and its solution viscosity is 121 centipoises. The polymer dissolves without forming gel.

Example 6

Polymerization is carried out as described in Example 5 but using a mixture of 50 parts of styrene and 50 parts of acrylonitrile instead of 100 parts of styrene and using a mixture of equal parts of titanium (IV) thioacetylacetonate and ruthenium (III) thioacetylacetonate instead of cerium complex. A polymer dispersion is obtained having a solids content of about 27% by weight, equivalent to a conversion of 97%.

Example 7

(a) A mixture of 500 parts of water and 25 parts of a 25% solution of the sodium salt of a higher fatty acid having twelve to twenty carbon atoms and (b) a mixture of 0.5 part of copper (I) thioacetic acid-3-methylbutene-(1)-ol-(3)-ester, 10 parts of chloroform, 1 part of trinonylphenyl phosphite and 120 parts of butadiene are continuously introduced per hour into a packed reactor.

Polymerization is carried out at 35° C. and with a mean residence time of the reaction mixture in the packed reactor of 2.5 hours. A dispersion is obtained which has a solids content of 10% by weight, equivalent to a conversion of 55%. The polymer dissolves in the usual solvents without gel formation. It has a K value of 82 and a solution viscosity of 60 centipoises.

When polymerization is carried out at 10° C. under othewise the same conditions, a dispersion is obtained which has a solids content of only 5.6%, equivalent to a conversion of 32%. The polymer is soluble without gel formation, has a K value of 74 and a solution viscosity of 42.5 centipoises.

Example 8

The procedure described under Example 1(a) is followed with the following modifications: 0.2 part of cobalt (III) thioacetylacetonate and 0.1 part of manganese (III) acetylacetonate are replaced by 0.3 part of vanadium (III) α-hydroxy-β-thiosuccinic acid chelate; 0.5 part of cyclooctadiene-1,5 is replaced by 0.3 part of cycloheptadiene. Polymerization is carried out for twenty hours at 70° C. A conversion of 84.2% is thus achieved.

The processed polymer has the following characteristics: K value 87; Mooney plasticity 41; Defo value at 30° C. 1230/39.

Example 9

The procedure of Example 1(a) is followed with the following modifications: 0.2 part of cobalt (III) thioacetylacetonate and 0.1 part of manganese (III) acetylacetonate are replaced by 0.5 part of niobium (IV) thiosalicylaldehyde chelate; 0.5 part of cyclooctadiene-1,5 is replaced by 0.5 part of cyclopentadiene, polymerization is carried out for twenty hours at 80° C. A conversion of 85.0% is achieved in this way.

After the polymer has been worked up it has the following characteristics: K value 82; Mooney plasticity 36; Defo value at 30° C. 1080/36.

Example 10

The procedure of Example 1(a) is followed with the following modifications: 0.2 part of cobalt (III) thioacetylacetonate and 0.1 part of manganese (III) acetylacetonate are replaced by 0.5 part of tantalum (V) thioacetic ethyl ester chelate; 0.5 part of cyclooctadiene-1,5 is replaced by 0.2 part of cyclohexadiene, Polymerization is carried out for twenty hours at 50° C. A conversion of 73.6% is achieved in this way.

When the polymer has been worked up it has the following characteristics: K value 81.5; Mooney plasticity 38; Defo value at 30° C. 1120/37.

Example 11

The procedure of Example 1(a) is followed but with the following alterations: 0.2 part of cobalt (III) thioacetylacetonate and 0.1 part of manganese (III) acetylacetonate are replaced by 0.1 part of gold (III) dithiodibenzoylmethane chelate; 0.5 part of cyclooctadiene-1,5 is replaced by 0.1 part of cyclooctatetraene. Polymerization is carried out for ten hours at 55° C. A conversion of 62.1% is achieved in this way.

After the polymer has been worked up it has the following characteristics: K value 91; Mooney plasticity 69; Defo value at 30° C. 2800/43.

Example 12

The procedure of Example 1(a) is followed but with the following changes: 0.2 part of cobalt (III) thioacetylacetonate and 0.1 part of manganese (III) acetylacetonate are replaced by 0.2 part of platinum (IV) monothiodibenzoylmethane chelate; 0.5 part of cyclooctadiene-1,5 is replaced by 0.2 part of cyclododecatriene. Polymerization is carried out for twelve hours at 60° C. A conversion of 70.4% is achieved in this way.

After the polymer has been worked up it has the following characteristics: K value 79; Mooney plasticity 32; Defo value at 30° C. 1050/24.

Example 13

The procedure of Example 1(a) is followed but with the following variations: 0.2 part of cobalt (III) thioacetylacetonate and 0.1 part of manganese (III) acetylacetonate are replaced by 0.4 part of chromium (III) β-thiobutyraldehyde chelate; 0.5 part of cyclooctadiene-1,5 is replaced by 0 01 part of bromoform. Polymerization is carried out for twenty hours at 40° C. A conversion of 89.4% is achieved in this way.

After the polymer has been worked up it has the following characteristics: K value 83.5; Mooney plasticity 34.5; Defo value at 30° C. 1390/41.

Example 14

The procedure of Example 1(a) is followed with the following exceptions: 0.2 part of cobalt (III) thioacetylacetonate and 0.1 part of manganese (III) acetylacetonate are replaced by 0.3 part of thallium (III) thioacetic n-butyl ester chelate; 0.5 part of cyclooctadiene-1,5 is replaced by 0 01 part of iodoform. Polymerization is carried out for thirty hours at 38° C. A conversion of 92.6% is achieved in this way.

The polymer is worked up and then has the following characteristics: K value 89; Mooney plasticity 42; Defo value at 30° C. 2700/40.

Example 15

The procedure of Example 1(a) is followed but with the following changes: 0.2 part of cobalt (III) thioacetylacetonate and 0.1 part of manganese (III) acetylacetonate are replaced by 0.2 part of silver (II) α-hydroxy-β-thiosuccinic acid chelate; 0.5 part of cyclooctadiene-1,5 is replaced by 0.1 part of isoamyl chloride. Polymerization is carried on for ten hours at 60° C. A conversion of 74.3% is achieved in this way.

When the polymer has been worked up it has the following characteristics: K value 76; Mooney plasticity 36; Defo value at 30° C. 950/23.

Example 16

The procedure of Example 1(a) is followed but with the following changes: 0.2 part of cobalt (III) thioacetylacetonate and 0.1 part of manganese (III) acetylacetonate are replaced by 0.6 part of mercury (II) monothioacetylacetone chelate; 0.5 part of cyclooctadiene-1,5 is replaced by 0.005 part of omega-bromoacetophenone. Polymerization is carried out for fifteen hours at 65° C. A conversion of 62.5% is achieved in this way.

The polymer is worked up and then has the following characteristics: K value 79.5; Mooney plasticity 39; Defo value at 30° C. 1010/31.

Example 17

The procedure of Example 1(a) is followed but with the following changes: 0.2 part of cobalt (III) thioacetylacetonate and 0.1 part of manganese (III) acetylacetonate are replaced by 0.2 part of gold (III) dithioacetylacetone chelate; 0.5 part of cyclooctadiene-1,5 is replaced by 0.7 part of fluorobenzene. Polymerization is carried out for twelve hours at 60° C. A conversion of 59.8% is achieved in this way.

The polymer is worked up and then has the following characteristics: K value 92; Mooney plasticity 74; Defo value at 30° C. 3050/44.

We claim:
1. A process for the production of 1,3-diene polymers by polymerizing 1,3-dienes having four to six carbon atoms wherein a polymerization catalyst is used which comprises a transition metal chelate complex of a thio-$\alpha,\beta$-dicarbonyl compound.
2. A process as claimed in claim 1 wherein the catalyst also comprises as a cocatalyst a cycloalkene.
3. A process as claimed in claim 1 wherein the catalyst also comprises as a cocatalyst an organic halogen compound.
4. A process as claimed in claim 1 wherein the catalyst also comprises as a cocatalyst a salt of a transition metal of Groups I to III of the Periodic System of Elements.
5. A process as claimed in claim 1 wherein the amount of the transition metal chelate complex of the thio-$\alpha,\gamma$-dicarbonyl compound is from 0.001 to 3% by weight on the amount of monomers.
6. A process as claimed in claim 1 carried out at temperatures of from 0° to 100° C.

No references cited.

JOSEPH L. SCHOFER, *Primary Examiner.*

R. A. GAITHER, *Assistant Examiner.*